United States Patent [19]

Kersey et al.

[11] Patent Number: 5,410,404
[45] Date of Patent: Apr. 25, 1995

[54] FIBER GRATING-BASED DETECTION SYSTEM FOR WAVELENGTH ENCODED FIBER SENSORS

[75] Inventors: Alan D. Kersey, Fairfax Station, Va.; Charles Askins, Upper Marlboro; E. Joseph Friebele, Cheverly, both of Md.

[73] Assignee: The United States of America as represented by the Secretary of the Navy, Washington

[21] Appl. No.: 159,169

[22] Filed: Nov. 30, 1993

[51] Int. Cl.[6] .................................. G01B 9/02
[52] U.S. Cl. ........................... 356/345; 250/227.27
[58] Field of Search ................... 356/345, 354; 250/227.11, 227.18, 227.19, 227.23, 227.27; 385/12, 13, 14, 15, 28

[56] References Cited

U.S. PATENT DOCUMENTS

| | | | |
|---|---|---|---|
| 4,653,916 | 3/1987 | Henning et al. | 356/345 |
| 4,755,668 | 7/1988 | Davis | 250/227.27 |
| 4,868,381 | 9/1989 | Davis | 250/227.27 |
| 4,873,989 | 10/1989 | Einzig | 356/345 |
| 4,996,419 | 2/1991 | Morey | 250/227.23 |
| 5,218,419 | 6/1993 | Lipson et al. | 356/345 |
| 5,227,857 | 7/1993 | Kersey | 250/227.27 |

Primary Examiner—Samuel A. Turner
Assistant Examiner—Russell C. Wolfe
Attorney, Agent, or Firm—Thomas E. McDonnell; Edward F. Miles

[57] ABSTRACT

An apparatus for the determination of the wavelength and the detection of wavelength shifts in wavelength-encoded fiber sensors, such as Bragg grating sensors. The apparatus is implemented in fiber and uses a pair of tuned fiber gratings to provide a filter type function that tracks the wavelength component of a signal from a wavelength-encoded sensor.

7 Claims, 4 Drawing Sheets

FIBER GRATING-BASED DETECTION SYSTEM FOR WAVELENGTH ENCODED FIBER SENSORS

BACKGROUND OF THE INVENTION

1. Field of the Invention

The present invention relates to a fiber grating based apparatus for detection of wavelength shifts. More particularly, this invention relates to a device using a pair of tuned fiber gratings to track wavelength shifts in wavelength-encoded fiber sensors.

2. Description of the Related Art

Recently, in-fiber grating sensors have attracted considerable interest because of their intrinsic nature and wavelength-encoded operation. These sensors are expected to be useful in a variety of applications such as in the area of advanced composite materials or "smart structures." In such applications, fibers can be embedded or incorporated into the materials or structures, without compromising the integrity of such materials or structures, to allow for the real time evaluation of conditions such as load, strain, temperature, and vibration to which the materials or structures are subjected.

Fiber gratings are well suited for use as sensing elements. When a fiber grating is illuminated, the grating reflects a narrow band of light at a specified wavelength. However, a measurand (e.g. strain, temperature) will induce a perturbation of the grating sensor which changes the wavelength of the light reflected by the grating. The value of the measurand is directly related to the wavelength reflected by the grating and can be determined by detecting the wavelength of the reflected light. This wavelength-encoded nature of the output of fiber gratings has advantages over intensity based sensing techniques because of the self-referencing nature of the output. The sensed information is encoded directly into the wavelength, which is an absolute parameter, and does not depend upon total light levels, losses in fibers or couplers, or variations in source intensity. Intensity based sensing schemes, on the other hand, depend upon total light levels and are affected by losses in the connecting fibers, by losses in couplers, and by variations in source intensity.

While the self-referencing nature of wavelength-encoded sensors makes the sensors well suited for use in advanced composite materials or structures, conventional approaches to accurately detect and determine the wavelength shifts of sensor returns are not well suited for such uses. Conventional means, such as a spectrometer, a monochromator, or use of a dispersive element coupled with an image array, are unattractive due to their cost, bulk optical nature and size, weight, and lack of ruggedness. Attempts to address these issues such as scanning a range of wavelengths with a single detector or using an interferometer as a wavelength detector are also unattractive because these attempts do not provide instantaneous or continuous detection and determination of wavelength. Additionally, they are difficult to incorporate into a system with several sensors in a single fiber without using time division multiplexing techniques.

SUMMARY OF THE INVENTION

It is an object of this invention to provide a wavelength detection apparatus that accurately detects and determines wavelength shifts in wavelength-encoded sensor returns.

Another object of the present invention is the provision of a wavelength detection apparatus that is capable of accurately determining the wavelength shifts in the output of a wavelength-encoded sensor without requiring relatively expensive, sizeable, cumbersome and/or fragile equipment.

A further object of the present invention is to provide a wavelength detection apparatus that is capable of instantaneous tracking and determination of wavelength shifts in the output signals of wavelength-encoded sensors.

Yet another object of the present invention is the provision of a wavelength detection apparatus that is capable of continuous tracking and determination of wavelength shifts in the output signals of wavelength-encoded sensors.

Yet a further object of the present invention is to provide a wavelength detection apparatus capable of simultaneously tracking and determining wavelength shifts in the output signals from multiple wavelength-encoded sensors in a single fiber optic cable without requiring complex time division multiplexing techniques.

Another object of the present invention is to provide a wavelength detection apparatus that uses a pair of tuned fiber grating detectors to track and determine the wavelength component of the signal returned from a wavelength-encoded sensor.

In accordance with these and other objects made apparent hereinafter, the invention concerns an apparatus for the detection of the wavelength and wavelength shifts in wavelength-encoded fiber sensors. The apparatus is implemented in fiber and uses a pair of tuned fiber gratings to provide a filter function that tracks the wavelength in the return signal from a wavelength-encoded sensor. The output of the filter contains necessary information to calculate the wavelength of the return signal from the sensor. Additionally, the fiber gratings can be mounted on a common piezoelectric transducer allowing the apparatus to be operated in a closed loop implementation where the output of the filter can be used to create an error signal which can then be used to control the piezoelectric transducer.

BRIEF DESCRIPTION OF THE DRAWINGS

These and other objects, features and advantages of the invention will become better understood by reference to the following detailed description when considered in connection with the accompanying drawings wherein like reference numerals and symbols designate identical or corresponding parts throughout the several views and wherein.

DETAILED DESCRIPTION

Figure 1:
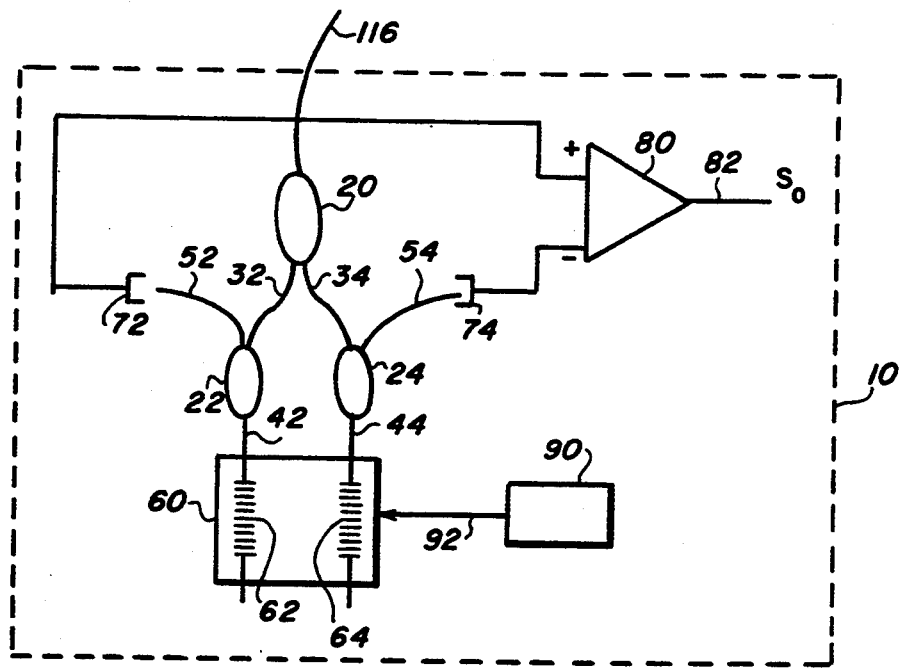
FIG. 1 is a diagram illustrating a first embodiment of the detection means of the present invention.

Referring now to FIG. 1, there is shown a first embodiment of wavelength detection means 10 of the present invention. In FIG. 1, fiber 116 carries a sensor signal from a wavelength encoded sensor (not shown), such as an in-fiber Bragg grating sensor, to coupler 20 of detection means 10. Coupler 20 directs the sensor signal carried by fiber 116 to fibers 32 and 34. Fiber 32 carries the sensor signal to coupler 22. Coupler 22 directs the sensor signal carried by fiber 32 to fiber 42 into which is written detector grating 62. Optical gratings 62 and 64, preferably Bragg gratings, are portions of optical fibers 42 and 44 that have been modified such that their index of refraction varies periodically. Detector grating 62 reflects light of certain wavelengths while allowing light of all other wavelengths to propagate through the grating. The component of light reflected from detector grating 62 returns through fiber 42 to coupler 22, while the light propagating through detector grating 62 is lost to the system. Similarly, the sensor signal propagating through fiber 34 is directed, via coupler 24, to fiber 44 into which is written detector grating 64.

Optionally, detector gratings 62 and 64 can be mounted onto a common electro-mechanical transducer 60, which is driven by controller 90. Output 92 of controller 90 can be varied to produce a change in the length of transducer 60, and therefore, a change in the length of detector gratings 62 and 64 as well. Altering the length of detector gratings 62 and 64 changes the wavelength component reflected by the gratings. Preferably transducer 60 exhibits a linear response to changes in output 92 of controller 90.

The component of light reflected from detector grating 62 propagates through fiber 42 toward coupler 22 where the light is coupled to fibers 52 and 32. The light coupled to fiber 52 is directed onto photodetector 72 which creates an electronic output proportional to the intensity of the light received at photodetector 72. Similarly, the component of light reflected from detector grating 64 propagates through fiber 44 toward coupler 24 where the light is coupled to fiber 54. Fiber 54 is directed to photodetector 74 which creates an electronic output proportional to the intensity of the light received at the photodetector.

The electronic outputs created by photodetectors 72 and 74 are combined in differential amplifier 80. Output 82 of differential amplifier 80 contains an output signal $S_O$ which can be used to determine the wavelength of the sensor signal carried to detection means 10 by fiber 116. Controller 90 provides a control signal to electro-mechanical transducer 60 to controllably stretch or contract along the length of gratings 62 and 64. This causes gratings 62 and 64 to contract or lengthen correspondingly. As a consequence, this permits controllable variation of wavelengths reflected by the detector gratings and thus the characteristic wavelength of the gratings. The relationship of $S_O$ to the wavelength of the sensor signal is explained below with reference to FIGS. 3A and 3B.

Preferably, transducer 60 operates such that it will exhibit a linear response to changes in output 92 of controller 90. By controlling the value of output 92 from controller 90, the wavelength component reflected by detector gratings 62 and 64 can be set to a specific wavelength. The wavelength component reflected by a grating is determined by the Bragg wavelength:

$$\lambda = 2n\Lambda \quad (1)$$

where n is the effective index of the core and $\Lambda$ is the period in the index modulation of the core. Increasing the length of the fiber increases the period in the index modulation thereby increasing the Bragg wavelength, while decreasing the length lowers the Bragg wavelength. Because detector gratings 62 and 64 are mounted on a common transducer, both gratings will increase or decrease in length by the same amount.

Figure 3A:
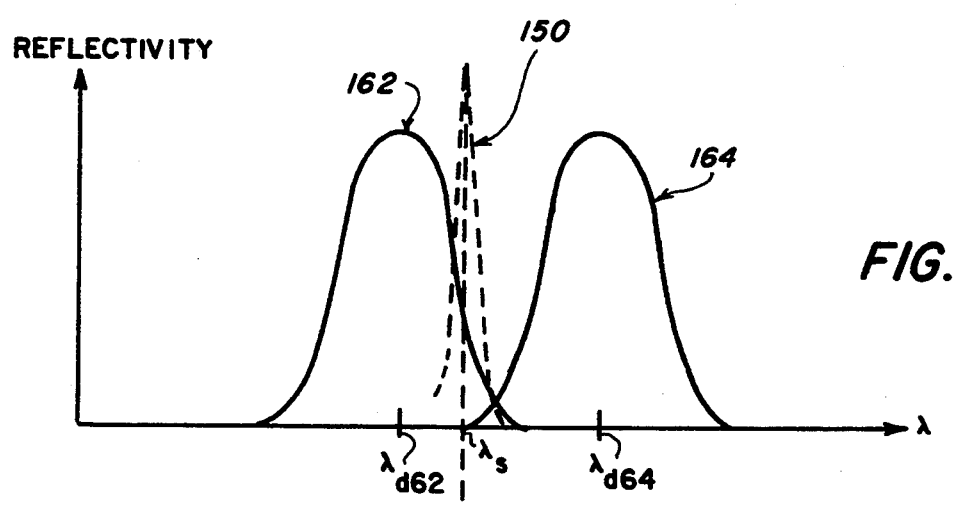
FIG. 3A shows the reflection spectrum of a pair of fiber gratings in accordance with the present invention.

FIG. 3A shows a graph of the reflection spectra of a pair of fiber gratings of the detection means in accordance with the present invention. In FIG. 3A, the vertical axis corresponds to the relative reflectivity of the fiber gratings, while the horizontal axis corresponds to the wavelength of the light incident upon the detector grating. The reflection spectrum of detector grating 62 of FIG. 1 is represented by line 162 and has a central reflecting wavelength (Bragg wavelength) of $\lambda_{d62}$. The reflection spectrum of detector grating 64 of FIG. 1, is represented by line 164 and has a Bragg wavelength of $\lambda_{d64}$. Dotted line 150, having central wavelength $\lambda_S$, represents the sensor signal from a wavelength encoded sensor. Preferably, the shape of reflection spectrum 162 matches the shape of reflection spectrum 164 with, typically, the bandwidth of spectra 162 and 164 being broader than the bandwidth of sensor signal 150.

Figure 3B:
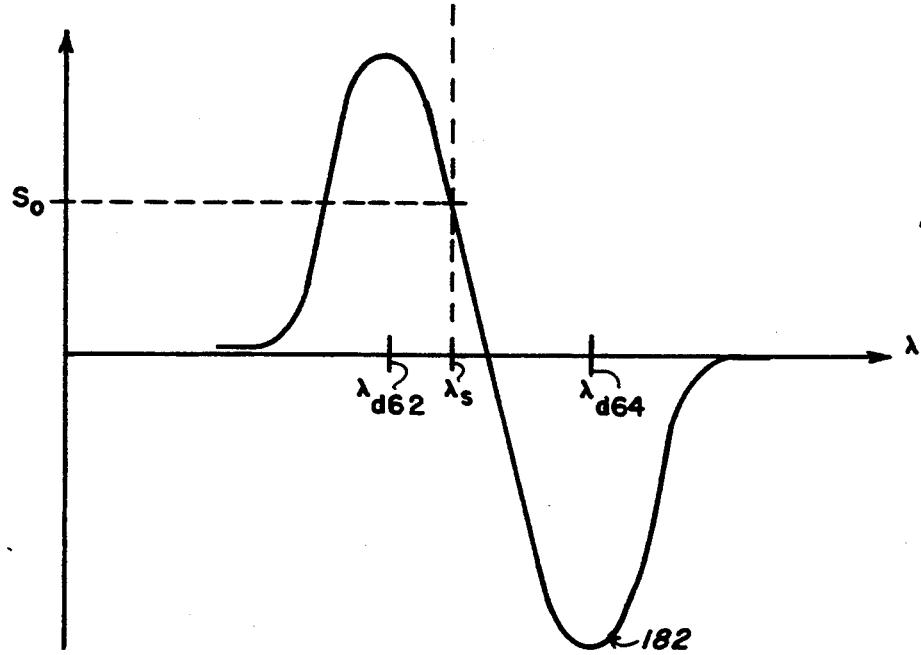
FIG. 3B shows the transfer function of the detection means of the present invention.

Referring now to FIG. 3B, there is shown a transfer function of the detection means of the present invention. In FIG. 3B, the vertical axis corresponds to the value of output signal measured at output 82 of FIG. 1, while the horizontal axis corresponds to the wavelength of the sensor signal incident upon the detector gratings. Line 182 represents the output as a function of wavelength of the differential combination of a component of light reflected from detector grating 62 of FIG. 1 with a reflection spectrum corresponding to spectrum 162 of FIG. 3A and a component of light reflected from detector grating 64 of FIG. 1 with a reflection spectrum corresponding to spectrum 164 of FIG. 3A. $S_O$ is the output value for a wavelength encoded signal having a central wavelength $\lambda_S$. Output function 182 exhibits a substantially monotonic change in $S_O$ for the range of wavelengths between $\lambda_{d62}$ and $\lambda_{d64}$ which correspond to the center wavelengths (Bragg wavelengths) of the detector gratings. Thus, each specific wavelength within the range $\lambda_{d62}$ to $\lambda_{d64}$ corresponds to a specific value for $S_O$ and changes in $\lambda_X$ are reflected directly in signal $S_O$. Additionally, there is one wavelength within the range $\lambda_{d62}$ to $\lambda_{d64}$ for which $S_O$ equals zero. By calibrating the output value $S_O$ over the range of wavelengths between $\lambda_{d62}$ and $\lambda_{d64}$, a value of $S_O$ can accurately be converted to determine the wavelength of the sensor signal. Bragg wavelengths $\lambda_{d62}$ and $\lambda_{d64}$ are typically set such that they are spaced by approximately twice the bandwidth of the reflection spectrum (162 or 164). This provides a longer linear area for transfer function 182 shown in FIG. 3B, increasing the sensitivity of the system.

Referring, once again, to FIG. 1, monitoring of output 82 of differential amplifier 80 tracks changes in signal $S_O$ thereby providing a continuous and instantaneous determination of sensor wavelength as well as the ability to detect and quantify changes in the sensor wavelength.

Increasing or decreasing the Bragg wavelengths of detector gratings 62 and 64 ($\lambda_{d62}$ and $\lambda_{d64}$) merely shifts the reflection spectra 162 and 164 of FIG. 3A right or left along the horizontal axis. Similarly, transfer function 182 of FIG. 3B will undergo an identical shift right or left. Since the output value $S_O$ over the range $\lambda_{d62}$ to $\lambda_{d64}$ is linear, the wavelength corresponding to $S_O$ is simply increased or decreased linearly with the shift in the Bragg wavelength. Because one knows the signature a priori of the transfer function in FIG. 3B, one can readily calibrate shift in the transfer function along the horizontal ($\lambda$) axis as a function of the value at output 92 (signal 92), for example by varying signal 92 and noting the change in signal $S_O$, or by determining the Bragg wavelengths of detector gratings 62 and 64 ($\lambda_{d62}$ and $\lambda_{d64}$) after shifting responsive to signal 92.

Transducer 60 can be calibrated such that for a given value at output 92 from controller 90 the exact Bragg wavelength of detectors 62 and 64 can be calculated. Thus, by monitoring the value of output 92 along the value of output signal $S_0$, signal wavelength $\lambda_X$ can be tracked.

Controlling the shift of $\lambda_{d62}$ and $\lambda_{d64}$ allows the detector to be used over a wide range of wavelengths. For example, if wavelength detection means 10 is used in a system to track the wavelength of a sensor designed to monitor changes in temperature, the transducer can be used to tune the detector gratings depending upon the ambient temperature. This allows the system be used over a wide range of ambient temperatures without having to change detector gratings. Additionally, this allows the system to be incorporated in a wide variety of materials or "smart structures" without knowing, a priori, the ambient conditions to which the materials will be subjected.

Figure 2:
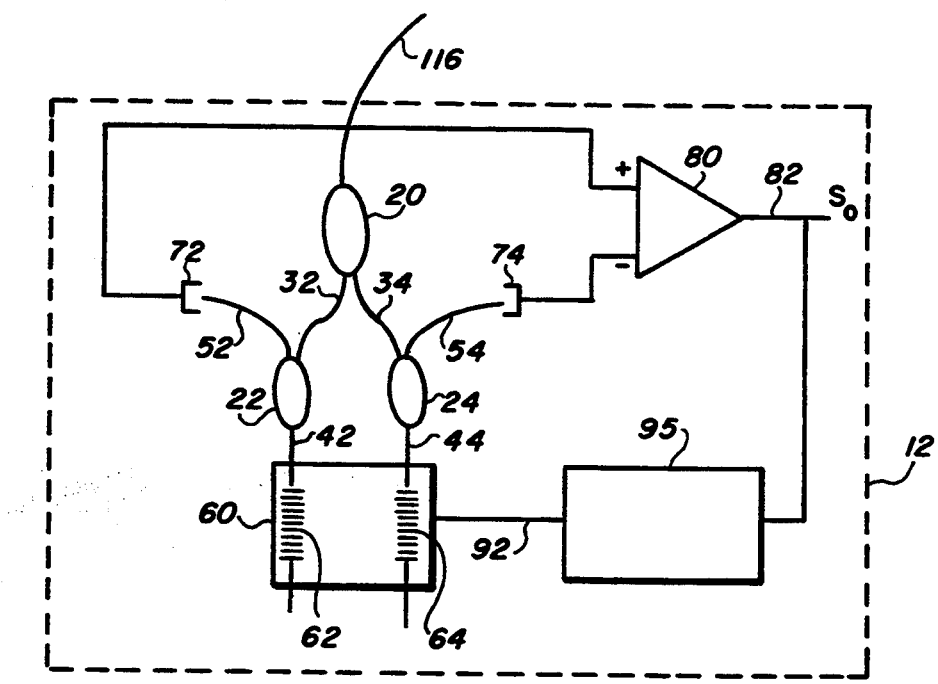
FIG. 2 is a diagram illustrating a second embodiment of the detection means in accordance with the present invention.

Referring now to FIG. 2, there is shown a second embodiment of the detection means of the present invention. The embodiment of FIG. 2 operates in a closed loop implementation. Fiber 116 carries a sensor signal from a wavelength encoded sensor (not shown), such as an in-fiber Bragg grating sensor, to coupler 20 of detection means 12. Coupler 20 directs the sensor signal carried by fiber 116 to fibers 32 and 34. The sensor signal propagating through fiber 32 is directed, via coupler 22, to fiber 42 into which is written detector grating 62. Detector grating 62 reflects the component of the sensor signal which corresponds to the Bragg wavelength. The component of light reflected from detector grating 62 returns through fiber 42 to coupler 22 where it is coupled to fiber 52. Fiber 42 is directed to photodetector 72 which creates an electronic output proportional to the intensity of the light received at photodetector 72. Similarly, the sensor signal propagating through fiber 34 is directed to fiber 44, containing detector grating 64, by coupler 24. The component of light reflected from detector grating 64 propagates through fiber 44 to coupler 24 where the light is coupled to fiber 54. Fiber 54 is directed to photodetector 74 which creates an electronic output proportional to the intensity of the light received at the photodetector. The electronic outputs created by photodetectors 72 and 74 are combined in differential amplifier 80. Output 82 of differential amplifier 80 is connected to feedback system 95. Output 92 of feedback system 95 is connected to transducer 60 onto which detector gratings 62 and 64 have been mounted.

In this embodiment, the characteristics, operation, and requirements of couplers 20, 22, and 24, detector gratings 62 and 64, and transducer 60 are as previously described in reference to FIGS. 1, 3A, and 3B.

In operation, detection means 12 produces signal $S_O$ at output 82 of differential amplifier 80 corresponding to the wavelength $\lambda_S$ of the sensor signal carried on fiber 116. Output signal $S_O$ has the same relationship to the sensor wavelength as discussed above, in reference to FIGS. 3A and 3B. As discussed above, output signal $S_O$ will be zero for one wavelength within the range $\lambda_{d62}$ to $\lambda_{d64}$. Feedback system 95 is designed to track changes in $S_O$ and, by using known feedback techniques, vary output 92 applied to transducer 60 to tune detector gratings 62 and 64 to maintain the null response in $S_O$. Sensor wavelength $\lambda_X$ is determined by monitoring output 92 of feedback system 95. The value of output 92 is used to determine the current Bragg wavelengths of detector gratings 62 and 64. The wavelength of the sensor signal is the wavelength which has an output value $S_O$ of zero for the current Bragg wavelengths of the detector gratings.

It should be noted that operating in the mode just described, the accuracy in the measurement of the wavelength of the sensor signal is determined by the response time of feedback system 95 and the resonance behavior of transducer 60. To improve the accuracy of detection means 12, output signal $S_O$, measured at output 82, can also be tracked, rather than assuming the value is zero. By tracking the value of $S_O$ along with the value of output 92, an accurate determination of the wavelength as well as changes in the wavelength of the sensor signal can be obtained.

In addition to tracking the value of $S_O$ and output 92, feedback system 95 can be configured to maintain output signal $S_O$ at zero for low-frequency or quasi-static variations in sensor wavelength $\lambda_S$. The higher frequency information, for example stresses caused by vibration, can be obtain by monitoring $S_O$ and output 92 without the inaccuracies induced by the response time of feedback system 95 and the resonance behavior of transducer 60.

Figure 4:
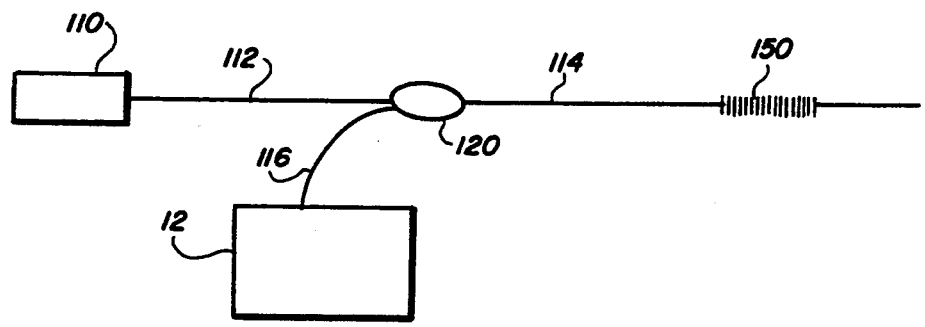
FIG. 4 is a diagram showing a first system incorporating the detection means of the present invention.

FIG. 4 shows a first system incorporating the detection means of the present invention. In FIG. 4, broadband input light, supplied from source 110, propagates through fiber 112 to coupler 120. Coupler 120 directs the broadband light carried by fiber 112 to fiber 114 such that broadband light propagates from coupler 120 to fiber grating sensing element 150. Sensor 150 reflects a narrow band component of the broadband light back to coupler 120 through fiber 114. The narrow band component of light reflected from sensor 150 is coupled to fiber 116 via coupler 120. Fiber 116 carries the narrow band component of light from coupler 120 to detection means 12. Detection means 12 determines the wavelength of the narrow band component of light reflected and tracks the wavelength component.

In operation, source 110, a broadband source such as an edge-emitting LED, superluminescent diode, or superfluorescent fiber source, illuminates fiber grating sensor 150. The bandwidth of source 110 is relatively broad; preferably, such that the bandwidth is greater than or equal to the specified working range of fiber grating sensor 150. Fiber grating sensor 150 is a fiber grating of a known kind, such as grating holographically written into a Ge-doped fiber by side exposure to UV interference patterns. In this manner, detection means 12 monitors the wavelengths reflected from sensor 150. Physical changes in sensor 150 (e.g. temperature, stress, strain, etc.) will cause a wavelength shift in light reflected from sensor 150, which detection means 12 monitors. The light reflected by sensor 150 is directed, via coupler 120, to fiber 116 which carries the light to detection means 12. Detection means 12 operates as described above in reference to FIG. 2.

Figure 5:
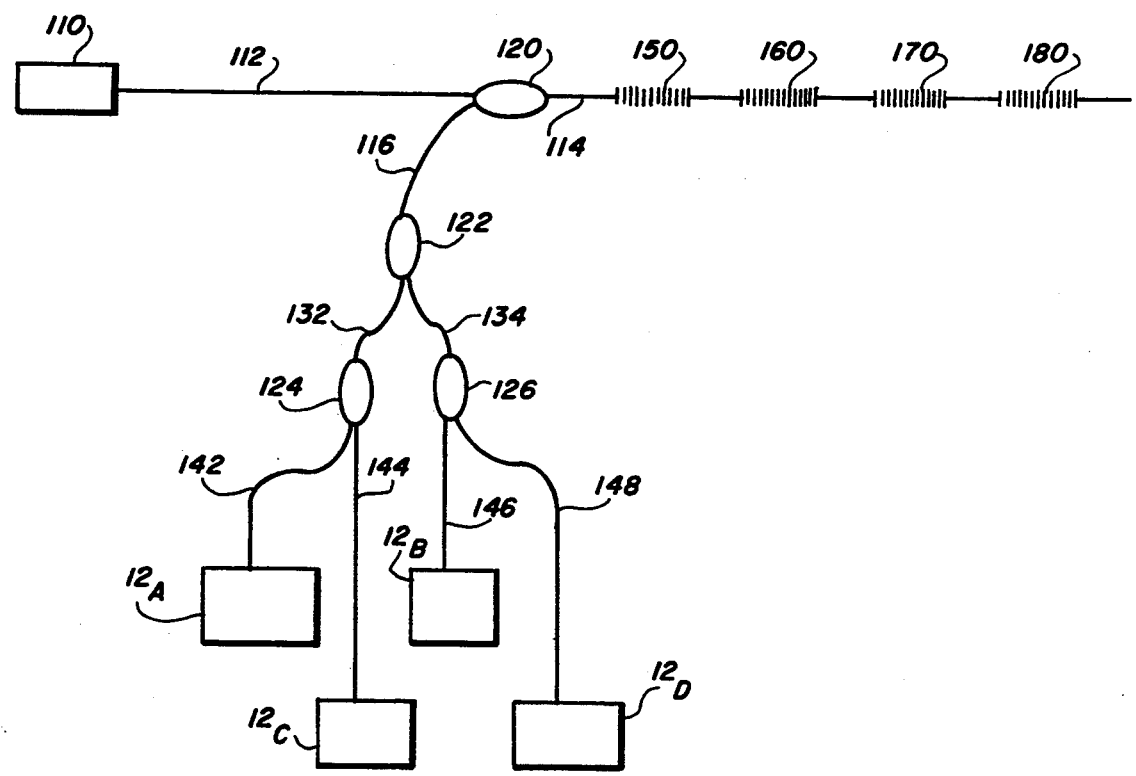
FIGS. 5 and 6 are diagrams illustrating second and third systems incorporating the detection means of the present invention.

FIG. 5 shows a second system incorporating the detection means of the present invention. In FIG. 5, broadband input light, supplied from source 110 is used to illuminate fiber 114 containing several wavelength encoded sensors. Broadband light, supplied from source 110, propagates through fiber 112 to coupler 120. Coupler 120 directs the broadband light carried by fiber 112 to fiber 114. The broadband light propagates from coupler 120 to fiber grating sensing element 150. Sensor 150 reflects light with a wavelength of $\lambda_{150}$ back to coupler 120 while allowing all other wavelengths to continue through fiber 114 to sensor 160. Sensor 160 reflects light with a wavelength of $\lambda_{160}$ back to coupler 120 while allowing all other wavelengths to continue through fiber 114 to sensor 170. Similarly, sensor 170 reflects light with a wavelength of 170 back to coupler 120 while allowing all other wavelengths to continue through fiber 114 to sensor 180. Sensor 180 likewise reflects light with wavelength of $\lambda_{180}$.

The light reflected from sensors 150, 160 170, and 180 is coupled to fiber 116 via coupler 120. Fiber 116 carriers the light to coupler 122 where it is coupled to fibers 132 and 134. The light propagating in fibers 132 and 134 is coupled, via couplers 124 and 126, respectively, to fibers 142, 144, 146, and 148. The light propagating in fibers 142, 144, 146, and 148 is directed to detection means $12_A$, $12_B$, $12_C$, and $12_D$, respectively.

In operation, detection means $12_A$, $12_B$, $12_C$, and $12_D$ operate as previously described in reference to FIG. 2. The signal received at each of the detection means 12 contains wavelength components reflected from each sensor ($\lambda_{150}$, $\lambda_{160}$, $\lambda_{170}$, and $\lambda_{180}$). Therefore, the sensors must be designed so that the range of wavelengths over which a sensor might be expected to reflect light must be separate from the range of wavelengths that any other sensor will reflect. That is to say, the bandwidths of light reflected from sensor gratings 150, 160 170, and 180 should be separate and well spaced.

Although each of the detection means will receive a signal comprised of multiple wavelength components, the detector gratings are tuned such that the Bragg wavelengths of the grating pair coincide with the range of wavelengths of a particular sensor. For example, the detector gratings (62 and 64) of detection means $12_A$ will be tuned such that only $\lambda_{180}$ will be within the range $\lambda_{d62}$ to $\lambda_{d64}$. Thus, each detection means will track a different signal component.

Figure 6:
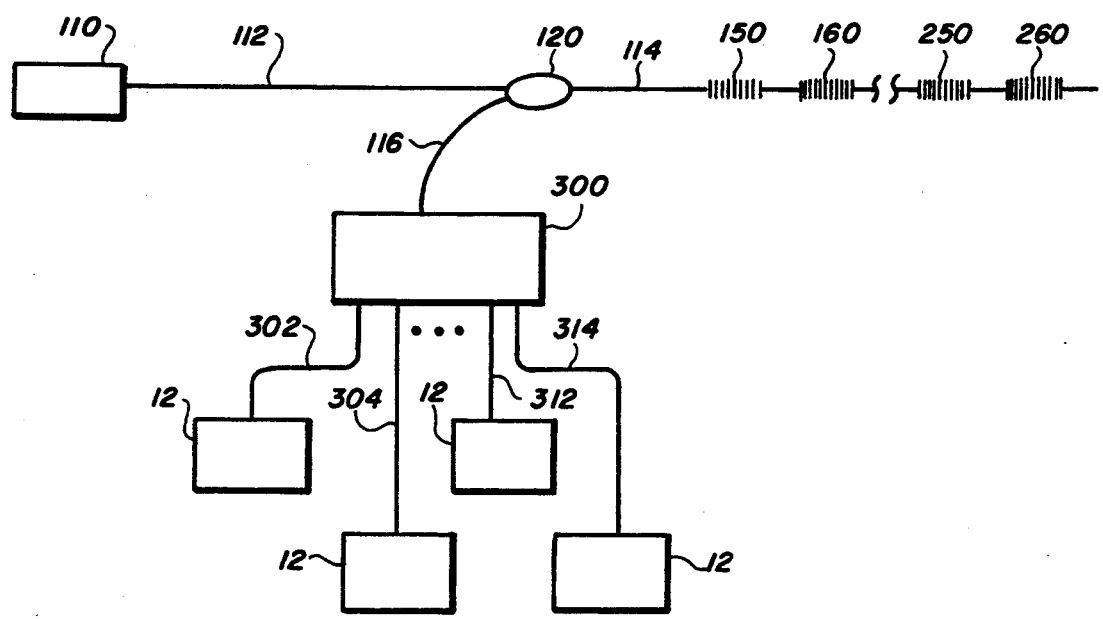

FIG. 6 shows a third system incorporating the detection means of the present invention. In FIG. 6, broadband input light, supplied from source 110 is used to illuminate fiber 114 containing several wavelength encoded sensors 150, 160, 250, and 260. Sensors 150, 160, 250, and 260 are designed such that each sensor has maximum reflectivity at a different wavelength than that of the other sensors and such that each sensor has a working range that is different from that of the other sensors. That is to say, that the bandwidths of light reflected from sensor gratings 150, 160 250, and 260 should be separate and well spaced. The wavelength encoded signals reflected from each of the sensors propagates through fiber 114 in the direction of coupler 120. Coupler 120 directs the sensor signals to fiber 116 which carries the signals to wave division multiplexer 300. Wave division multiplexer 300 directs the signal received to one of several output fibers 302, 304, 312, 314 based upon the frequency of the signal. Fibers 302, 304, 312, and 314 are each directed to detection means 12 of the type described above in reference to FIG. 2.

In operation, wave division multiplexor 300 receives a signal which contains wavelength components reflected from each sensor. Wave division multiplexor 300 directs the signal to an output fiber in a manner such that each output fiber contains a signal with wavelength components in a specified range. For example, if the input signal contains wavelength components over the range of 11 to 90 nanometers, the wave division multiplexor can be configured so that output fiber 1 contains the portion of the signal with wavelength components between 11 and 20 nm, fiber 2 contains wavelength components between 21 and 30 nm and so on.

For the signal returned from sensor gratings 150, 160 250, and 260, wave division multiplexor 300 would be configured such that each output fiber 302, 304, 312, and 314 would contain a signal having wavelength components within a range corresponding to the bandwidth of a particular sensor grating. The detection means 12 associated with each output fiber 302, 304, 312, and 314 would be tuned to monitor the wavelengths reflected from the particular sensor to which the output fiber corresponds.

The many features and advantages of the present invention are apparent from the detailed specification and thus it is intended by the appended claims to cover all such features and advantages of the invention which follow in the true spirit and scope thereof. Further, since numerous modifications and changes will readily occur to those skilled in the art, it is not desired to limit the invention to the exact construction and operation illustrated and described, and accordingly all suitable modifications and equivalence may be resorted to as falling within the scope of the invention.

What is claimed is:

1. An apparatus for the detection of wavelength shifts in wavelength encoded signals comprising:
   a first optical fiber having a first fiber grating;
   a second optical fiber having a second fiber grating;
   a means to direct an input signal to said first and said second optical fibers;
   a first photodetector, responsive to light reflected by said first fiber grating, for generating an output signal proportional to said light reflected;
   a second photodetector, responsive to light reflected by said second fiber grating, for generating an output signal proportional to said light reflected by said second fiber grating; and
   a means for differential combination of said output signal of said first photodetector with said output signal of said second photodetector.

2. The apparatus of claim 1:
   wherein said first fiber grating and said second fiber grating are mounted onto a common transducer and
   further including a means for controlling said transducer.

3. The apparatus of claim 2 wherein said means for controlling said transducer is responsive to said means for differential combination.

4. The apparatus of claim 2, wherein said means for controlling is a feedback element effective, responsive to said differential combination, to cause a change in the length of said first and said second fiber gratings by causing a change in the length of said common transducer.

5. The apparatus of claim 4, wherein said feedback element is further effective, responsive to said differential combination, to cause the magnitude of said change in said length to substantially null said differential combination.

6. The apparatus of claim 1, wherein said means to direct an input signal comprises:
   an additional optical fiber;
   at least one additional fiber grating in said additional optical fiber;
   a light source means for injecting light into said additional fiber effective to cause reflection from at least one of said at least one additional fiber grating; and
   coupling means for coupling said reflection to said first and said second gratings effective to constitute said input signal to said first and second optical fibers.

7. An apparatus for the detection of wavelength shifts in wavelength encoded signals comprising:
   a fiber optic cable containing an in-fiber grating;
   a light source for injecting an optical signal into said fiber optic cable; and
   means for detecting the wavelength of light reflected by said in-fiber grating;
   wherein said means for detecting comprises:
   a first fiber grating;
   a second fiber grating;
   a means to direct an input signal to said first and said second fiber gratings, said input signal being light reflected from said in-fiber grating;
   a first photodetector, responsive to light reflected by said first fiber grating, for generating an output signal proportional to the intensity of light received;
   a second photodetector, responsive to light reflected by said second fiber grating, for generating an output signal proportional to the intensity of the light received; and
   a means for differential combination of the output of said first photodetector with the output of said second photodetector.

* * * * *